April 22, 1958     R. C. STRAUSS     2,831,555
BRAKE AND MOTOR CONTROL
Original Filed Sept. 8, 1944
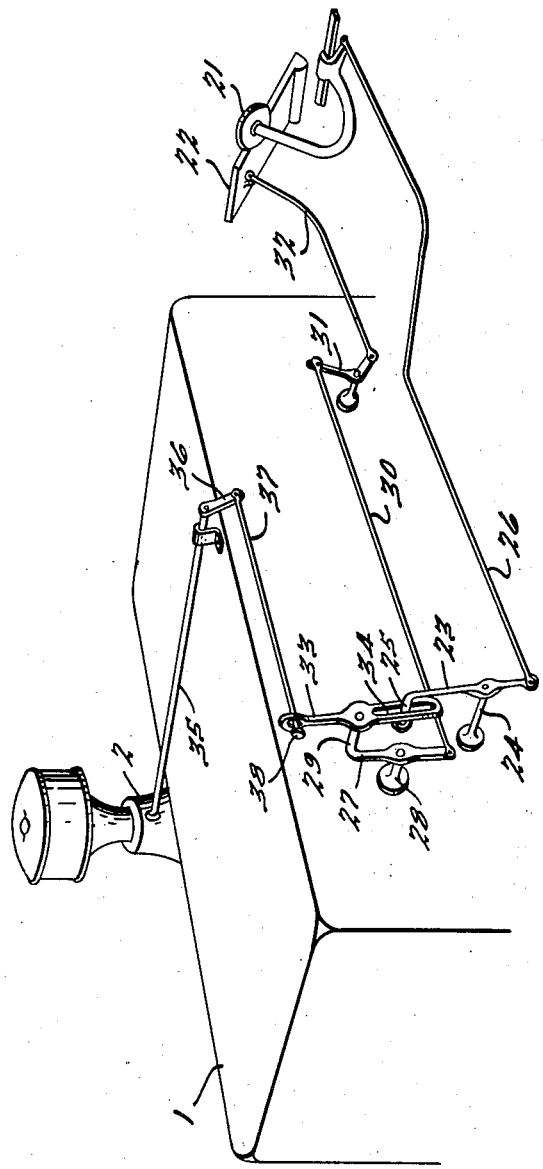
INVENTOR.
Ray C. Strauss.
BY United States Patent Office 2,831,555
Patented Apr. 22, 1958

2,831,555

BRAKE AND MOTOR CONTROL

Ray C. Strauss, Ann Arbor, Mich.

Original application September 8, 1944, Serial No. 553,274, now Patent No. 2,642,166, dated June 16, 1953. Divided and this application February 29, 1952, Serial No. 274,107

2 Claims. (Cl. 192—3)

This invention relates to means for automatically regulating the flow of motive power to a motor on operation of the brake control of a motor driven vehicle, and is adapted for use with all types of motor driven vehicles, such as automobiles, busses, trucks and the like driven by fuel such as gasoline and diesel oil, and by motive power such as steam and electric energy.

Numerous means have been proposed for controlling the operation of throttle limiting devices upon operation of the brake control. These means have been designed to prevent waste of fuel and to increase the safety element. In certain of these devices, the brake and throttle pedals have been mounted in close proximity and in a common plane. This type of mounting has been proposed to reduce the reaction time to a minimum and permits the application of pressure to the brake pedal in the minimum time period.

One of the objects of this invention is to provide means for preventing the flow of motive power to the motor above the normal amount; for example, of fuel to the internal combustion engine above idling speed, upon application of pressure to the brake pedal.

Another object of this invention is to provide means whereby the throttle pedal may be depressed along with the brake pedal without permitting the flow of motive power to the engine above idling speed.

A further object of this invention is to provide means whereby the brake pedal and throttle pedal may be disposed in the conventional manner, may be disposed in close proximity or may or may not be disposed in a common plane.

Another object of this invention is to provide means whereby the driver of a vehicle may fix or set the hand throttle and when the brake is applied, the motive power; for example, the fuel supply, is automatically reduced to that which is normal for idling speed.

Other objects and advantages of the invention will become apparent upon consideration of the drawing which shows a linkage system for reducing the fuel fed to the engine upon application of the brake pedal.

In the drawing, a brake pedal 21 and an accelerator pedal 22 are mounted in the conventional manner. A bell crank 23 is rotatably mounted on post 24 which is, in turn, mounted on motor block 2. The upper end of bell crank 23 is turned inwardly at right angles to form a pin 25. The lower end of bell crank 23 is connected to the brake pedal arm by link 26. A second bell crank 27 is rotatably mounted on post 28 which is, in turn, mounted on motor block 2. The upper end of bell crank 27 is turned outwardly at right angles to form a pin 29. The lower end of bell crank 27 is connected with accelerator pedal 22 by means of push rod or link 30, crank 31 and push rod or link 32. A lever 33 is pivotally secured to the pin 29 of bell crank 27. The lower portion of lever 33 is provided with a slot 34 which receives pin 25 of crank 23. The carburetor shaft 35 is provided with a crank 36. Rod 37 is connected to crank 36 and passes through the upper end of lever 33 and is provided with an enlarged bearing head 38. It is apparent that suitable means is provided to constantly urge the carburetor shaft 35 into normal throttle position.

The brake pedal arm preferably extends to one side and in front of the shaft so that link 26, the brake pedal arm and shaft are in a single line. The force exerted on link 26 upon application of pressure to the accelerator pedal is thus rendered ineffective in causing a braking action or motion of the brake pedal arm and associated elements.

Upon application of pressure to the accelerator pedal, motion is transmitted to bell crank 27 causing a counterclockwise rotation of the bell crank. Bell crank 23 remains fixed and pin 25 serves as a pivotal point for lever 33. The motion of crank 27 and pin 29 causes a pivoting of lever 33 about pivot point or pin 25 in a counterclockwise direction. The upper end of lever 33 pulls rod 37 and thereby opens the carburetor valve.

If pressure is simultaneously applied to brake pedal 21, bell crank 23 is rotated in a counterclockwise direction thereby shifting the pivot point or pin 25 and rotating lever 33 in a clockwise direction permitting a return of valve shaft 35 and crank 36 to their idling position. The carburetor valve may be constantly urged into a throttle position by spring means. If the accelerator pedal is in idling position, application of pressure to the brake pedal causes a counterclockwise rotation of crank 23 which through pin 25 causes a clockwise rotation of lever 33 about pin 29. Such movement of lever 33 introduces slack between the upper end of lever 33 and head 38 on rod 37 whereby any rotation of lever 33 about pin 25 caused by movement of accelerator pedal 22 is ineffective in opening the carburetor valve.

This application is a division of my prior application, Serial No. 553,274, filed September 8, 1944, now Patent No. 2,642,166, issued June 16, 1953.

What is claimed is:

1. In a motor driven vehicle including a motor, a carburetor, a throttle valve operating member for the carburetor and means for braking the vehicle including a brake pedal, the combination of an accelerator pedal, a lever supported from the motor operatively connected to the throttle valve operating member and to the accelerator pedal and adapted to be pivoted by movement of the accelerator pedal to transmit motion from the accelerator pedal to the throttle valve operating member and means operable by movement of the brake pedal for shifting the pivot point of said supported lever to prevent transmission of motion from the accelerator pedal to the throttle valve.

2. In an automobile or the like having a carburetor operating member, an accelerator pedal, and a brake pedal, the combination of a longitudinally movable rod operatively connected to the accelerator pedal for movement thereby, a second longitudinally movable rod operatively connected to the carburetor operating member to actuate the same, resilient means biasing the second rod to move in one direction, a lost motion type connection interconnecting the rods comprising a link having a one-way abutment engagement with the second rod so that movement of the link in one direction moves the rod against the pressure of said resilient means but movement of the link in the opposite direction is not transmitted to the rod, said link having a shiftable pivot axis, means pivotally connecting the first rod to the link whereby movement of the rod moves the said link about said axis in a direction such that the second rod is moved by virtue of the abutment engagement, and means connecting the brake pedal to the shiftable pivot axis whereby actuation of the brake pedal shifts the pivot axis in a direction to break the abutment engagement by moving the link in a direction opposite to accelerating movement.

References Cited in the file of this patent

UNITED STATES PATENTS

| | | |
|---|---|---|
| 1,247,299 | Loomis | Nov. 20, 1917 |
| 2,040,716 | Summers | May 12, 1936 |
| 2,094,383 | Staude | Sept. 28, 1937 |
| 2,203,777 | Detmers | June 11, 1940 |
| 2,556,485 | Robnett | June 12, 1951 |
| 2,621,766 | Patrick | Dec. 16, 1952 |
| 2,642,166 | Strauss | June 16, 1953 |